United States Patent
Gemmiti et al.

(10) Patent No.: US 12,227,353 B2
(45) Date of Patent: Feb. 18, 2025

(54) SINGLE USE BEVERAGE POD

(71) Applicant: Club Coffee L.P., Etobicoke (CA)

(72) Inventors: Claudio Gemmiti, Etobicoke (CA);
Rajeshkumar Patel, Etobicoke (CA);
Mark Grady, Etobicoke (CA)

(73) Assignee: Club Coffee L.P., Etobicoke (CA)

( * ) Notice: Subject to any disclaimer, the term of this patent is extended or adjusted under 35 U.S.C. 154(b) by 0 days.

(21) Appl. No.: 17/174,460

(22) Filed: Feb. 12, 2021

(65) Prior Publication Data
US 2021/0253335 A1 Aug. 19, 2021

Related U.S. Application Data

(60) Provisional application No. 62/976,167, filed on Feb. 13, 2020.

(51) Int. Cl.
*B65D 85/804* (2006.01)
*A23F 5/26* (2006.01)

(52) U.S. Cl.
CPC .......... *B65D 85/8061* (2020.05); *A23F 5/262* (2013.01); *B65D 85/8064* (2020.05)

(58) Field of Classification Search
CPC ............ B65D 85/8043; B65D 85/8061; B65D 85/8064; A23F 5/262
See application file for complete search history.

(56) References Cited

U.S. PATENT DOCUMENTS 2,926,088 A * 2/1960 Spiselman ......... B65D 85/8061
426/132
3,347,151 A * 10/1967 Ronalds ................ A47J 31/057
426/77

(Continued)

FOREIGN PATENT DOCUMENTS

CA 2893697 1/2018
EP 3221238 9/2017

(Continued)

OTHER PUBLICATIONS

Polyvinyl Alcohol, Chemical and Technical Assessment, Food and Agriculture Organization (FAO), [online] 2004—no month given, retrieved Dec. 29, 2021. Retrieved from the Internet: URL:<https://www.fao.org/fileadmin/templates/agns/pdf/jecfa/cta/61/PVA.pdf>. *

(Continued)

*Primary Examiner* — Viren A Thakur
*Assistant Examiner* — Chaim A Smith
(74) *Attorney, Agent, or Firm* — Faegre Drinker Biddle & Reath LLP (57) ABSTRACT

A single use beverage pod for use in producing a beverage comprises: a body defining a cavity; a beverage medium contained within the cavity; and a protective barrier coupled to the body and at least partially sealing the beverage medium from a surrounding environment to provide at least one of an oxygen barrier and a moisture barrier, the protective barrier having a dissolvable region that is configured to dissolve during production of the beverage to provide a passageway through the protective barrier. The oxygen barrier and/or moisture barrier provided by the protective barrier can reduce the need for, and/or complexity of, packaging for the beverage pod. The dissolvable region dissolves during production of the beverage, allowing the beverage pod to be used with conventional brewing machines without modification thereof.

16 Claims, 8 Drawing Sheets

(56) References Cited

U.S. PATENT DOCUMENTS

| | | | |
|---|---|---|---|
| 5,840,189 A | 11/1998 | Sylvan et al. | |
| 9,480,647 B2 | 11/2016 | Benson et al. | |
| 2012/0269933 A1 | 10/2012 | Rapparini | |
| 2014/0342059 A1* | 11/2014 | Trombetta | B65D 85/8061 |
| | | | 426/115 |
| 2015/0110929 A1 | 4/2015 | Camera | |
| 2015/0352044 A1* | 12/2015 | Benson | B65B 7/2842 |
| | | | 206/205 |
| 2016/0096681 A1* | 4/2016 | Wicks | B65D 85/8052 |
| | | | 426/115 |
| 2016/0251149 A1* | 9/2016 | Gerbaulet | B65B 7/28 |
| | | | 426/115 |
| 2019/0282022 A1 | 9/2019 | Singer | |

FOREIGN PATENT DOCUMENTS

| | | |
|---|---|---|
| EP | 3030503 | 11/2017 |
| WO | 2016079701 | 5/2016 |

OTHER PUBLICATIONS

Extended European Search Report for European Application No. 21156985.0, dated Jul. 30, 2021, 7 pages.

\* cited by examiner

SINGLE USE BEVERAGE POD

CROSS-REFERENCE TO RELATED APPLICATION

This application claims the benefit of U.S. Provisional Patent Application No. 62/976,167 filed on Feb. 13, 2020, and titled SINGLE USE BEVERAGE POD, the entirety of which is incorporated by reference.

FIELD

The subject disclosure generally relates to food containers, and more particularly to a single use beverage pod and a method for producing beverages using the same.

BACKGROUND

Single use beverage pods, such as single serve coffee pods, are well known. These beverage pods are sometimes referred to as single serve capsules, single serve containers or single serve portion packs. In any case, the beverage pods are designed to be used with a brewing machine to produce a desired beverage. These beverage pods are typically made using a variety of different types of materials and/or packaging, which surrounds and protects the ingredients in the pods from staling and enables the pods to be used in brewing machines. This packaging can include primary packaging and/or secondary packaging. Primary packaging directly surrounds the ingredients and/or one or more of the pods and is often formed of a rigid plastic or a flexible packaging film. On the other hand, secondary packaging surrounds otherwise enclosed pods, such as to group the pods together for distribution and storage. Secondary packaging is often formed of a semi-rigid material, such as paperboard or cardboard.

Packaging can provide a barrier, such as an oxygen barrier and/or a moisture barrier, to prolong the usable life of the pods enclosed therein. It will be appreciated that a moisture barrier, in this context, means a water vapour barrier. To provide the oxygen barrier and/or the moisture barrier, packaging is often formed of one or more layers of material such as plastic, paper, metal, wax, polymer, etc. To reduce the environmental impact of packaging, recyclable, degradable and compostable packaging films are available.

Packaging, whether degradable, compostable or not, needs to be opened or removed in some manner in order to access the enclosed pods and/or products. Once the packaging is no longer needed, it can be discarded or disposed of in a municipal or industrial waste, recycling or composting program. The need to remove and dispose of packaging is especially burdensome for single use beverage pods, since the packaging must be removed and disposed of each time a pod is used.

While degradable packaging films are laudable, improvements and alternatives are generally desired to reduce the amount, complexity and/or end-of-life impacts of packaging for single use beverage pods.

SUMMARY

It should be appreciated that this Summary is provided to introduce a selection of concepts in a simplified form that are further described below in the Detailed Description of Embodiments. This Summary is not intended to be used to limit the scope of the claimed subject matter.

In an aspect of the subject disclosure, there is provided a single use beverage pod for use in producing a beverage, the beverage pod comprising: a body defining a cavity; a beverage medium contained within the cavity; and a protective barrier coupled to the body and at least partially sealing the beverage medium from a surrounding environment to provide at least one of an oxygen barrier and a moisture barrier, the protective barrier having a dissolvable region that is configured to dissolve during production of the beverage to provide a passageway through the protective barrier.

In one or more embodiments, the body comprises a filter for separating the beverage from the beverage medium during production of the beverage. The dissolve region can be aligned with the filter. The body can be formed from one of a shaped filter paper and a molded nonwoven fabric, and the one of the shaped filter paper and the molded nonwoven fabric provides the filter.

In one or more embodiments, the protective barrier comprises a first membrane and a second membrane, which cooperate to substantially seal the beverage medium and provide the at least one of the oxygen barrier and the moisture barrier, and the second membrane comprises the dissolvable region. In some embodiments, the first membrane can be coupled to a first side of the body and the second membrane can be coupled to a second side of the body, opposite the first side, and the second membrane can be positioned outside the body. The first side may be a top of the body and the first membrane may cover an opening to the cavity at the top of the body, and the second side may be a bottom of the body and the second membrane may surround the bottom of the body. In other embodiments, the first membrane can be coupled to the second membrane and the second membrane can be coupled to the body, and the second membrane can be positioned at least partially inside the body. The entire second membrane can be dissolvable in water and may define the dissolvable region.

In one or more embodiments, the protective barrier comprises a membrane and a coating, which cooperate to substantially seal the beverage medium and provide the at least one of the oxygen barrier and the moisture barrier, and the coating comprises the dissolvable region. The membrane can be coupled to the body and may cover an opening to the cavity. The coating can be provided on the body, on at least one of an inside of the body and an outside of the body. In some embodiments, the entire coating can be dissolvable in water and may define the dissolvable region. In some embodiments, the dissolvable region is flexible.

In one or more embodiments, the beverage pod further comprises a support ring coupled to the body and the protective barrier, the support ring being configured to secure the beverage pod within a brewing machine during production of the beverage. The support ring may be directly coupled to the protective barrier. The support ring, the protective barrier and the body can be coupled together without an adhesive.

In one or more embodiments, the dissolvable region is food safe and is formed from at least one of polyvinyl alcohol (PVOH), hydroxypropyl cellulose (HPC), polysaccharide, Pullulan, modified food starch and a dissolvable plant derived polymer. In some embodiments, the dissolvable region is formed from HPC.

In another aspect of the subject disclosure, a method for producing a beverage is provided. The method comprising: inserting a single use beverage pod into a brewing machine, the beverage pod comprising a protective barrier that at least partially seals a beverage medium in the beverage pod from a surrounding environment, to provide at least one of an oxygen barrier and a moisture barrier, the protective barrier having a dissolvable region; introducing a brewing liquid into the beverage pod to mix with the beverage medium and produce the beverage; and dissolving the dissolvable region to provide a passageway for the beverage though the protective barrier and out of the beverage pod.

In some embodiments, the protective barrier comprises a membrane that defines the dissolvable region, and dissolving the dissolvable region comprises dissolving at least part of the membrane. In other embodiments, the protective barrier comprises a coating on a body of the beverage pod, the coating defines the dissolvable region, and dissolving the dissolvable region comprises dissolving at least part of the coating.

In another aspect of the subject disclosure, a single use beverage pod for use in producing a beverage is provided. The beverage pod comprises: a body defining a cavity; a beverage medium contained within the cavity; and a protective barrier coupled to the body and at least partially sealing the beverage medium from a surrounding environment to provide at least one of an oxygen barrier and a moisture barrier, the protective barrier having a membrane that includes a dissolvable region that is configured to dissolve during production of the beverage to provide a passageway through the protective barrier, wherein the dissolvable region defines at least part of an exterior surface of the beverage pod and is positioned outside of the body, such that at least a portion of the dissolvable region is removable by a user prior to producing the beverage.

In another aspect of the subject disclosure, a method for producing a beverage using a single use beverage pod, which has a protective barrier that at least partially seals a beverage medium in the beverage pod from a surrounding environment, is provided. The method comprises: removing at least a portion of a dissolvable region of a membrane of the protective barrier prior to inserting the beverage pod into a brewing machine; inserting the beverage pod into the brewing machine; and introducing a brewing liquid into the beverage pod to mix with the beverage medium and produce the beverage.

BRIEF DESCRIPTION OF THE DRAWINGS

Embodiments will now be described more fully with reference to the accompanying drawings, in which.

DETAILED DESCRIPTION OF EMBODIMENTS

The foregoing summary, as well as the following detailed description of certain embodiments will be better understood when read in conjunction with the accompanying drawings. As used herein, an element or feature described in the singular and preceded by the word "a" or "an" should be understood as not necessarily excluding a plural of the elements or features. Further, references to "one example" or "one embodiment" are not intended to be interpreted as excluding the existence of additional examples or embodiments that also incorporate the described elements or features of that one example or one embodiment. Moreover, unless explicitly stated to the contrary, examples or embodiments "comprising," "having" or "including" an element or feature or a plurality of elements or features having a particular property may further include additional elements or features not having that particular property. Also, it will be appreciated that the terms "comprises," "has" and "includes" mean "including but not limited to" and the terms "comprising," "having" and "including" have equivalent meanings.

As used herein, the term "and/or" can include any and all combinations of one or more of the associated listed elements or features.

It will be understood that when an element or feature is referred to as being "on," "attached" to, "connected" to, "coupled" with, "contacting," etc. another element or feature, that element or feature can be directly on, attached to, connected to, coupled with or contacting the other element or feature or intervening elements may also be present. In contrast, when an element or feature is referred to as being, for example, "directly on," "directly attached" to, "directly connected" to, "directly coupled" with or "directly contacting" another element or feature, there are no intervening elements or features present. Similarly, it will be understood that when an element is referred to as being "directly between" other elements, that element is positioned between the other elements without any intervening elements. In contrast, when an element is referred to as being merely "between" other elements, that element is positioned between the other elements but intervening elements may also be present.

It will be understood that spatially relative terms, such as "under," "below," "lower," "over," "above," "upper," "front," "back" and the like, may be used herein for ease of describing the relationship of an element or feature to another element or feature as depicted in the figures. The spatially relative terms can however, encompass different orientations in use or operation in addition to the orientation depicted in the figures.

Reference herein to "example" means that one or more feature, structure, element, component, characteristic and/or operational step described in connection with the example is included in at least one embodiment and/or implementation of the subject matter according to the subject disclosure. Thus, the phrases "an example," "another example," and similar language throughout the subject disclosure may, but do not necessarily, refer to the same example. Further, the subject matter characterizing any one example may, but does not necessarily, include the subject matter characterizing any other example.

Reference herein to "configured" denotes an actual state of configuration that fundamentally ties the element or feature to the physical characteristics of the element or feature preceding the phrase "configured to."

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of a lower-numbered item (e.g., a "first" item) and/or a higher-numbered item (e.g., a "third" item).

As used herein, the terms "substantially," "generally," "approximately" and "about" represent an amount or characteristic close to the stated amount or characteristic, which still performs the desired function or achieves the desired result. For example, the terms "approximately" and "about" in reference to a stated number would include amounts that are within design tolerances of the stated number, as would be readily appreciated by a person skilled in the art. Similarly, for example, the term "substantially" in reference to a stated characteristic would include elements that nearly completely provide the stated characteristic, and the term "generally" in reference to a stated characteristic would include elements that predominantly provide the stated characteristic.

Figure 1:
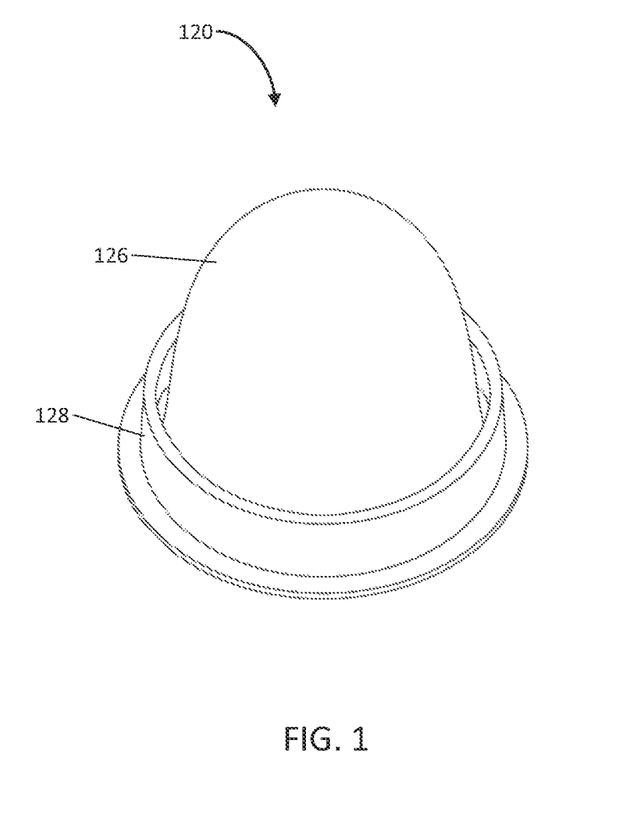
FIG. 1 is an axonometric view of a single use beverage pod, taken from below.
Figure 2:
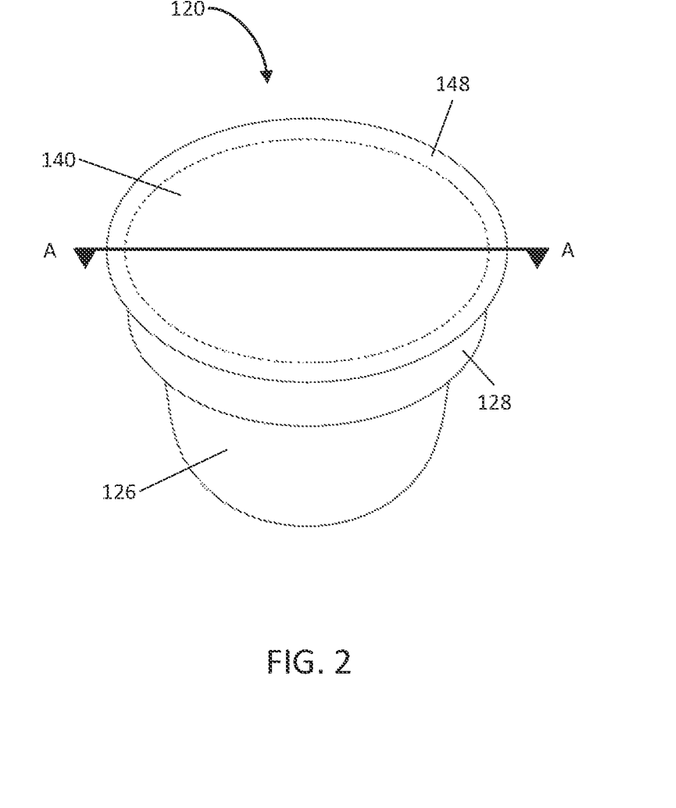
FIG. 2 is an axonometric view the single use beverage pod of FIG. 1, taken from above.
Figure 3:
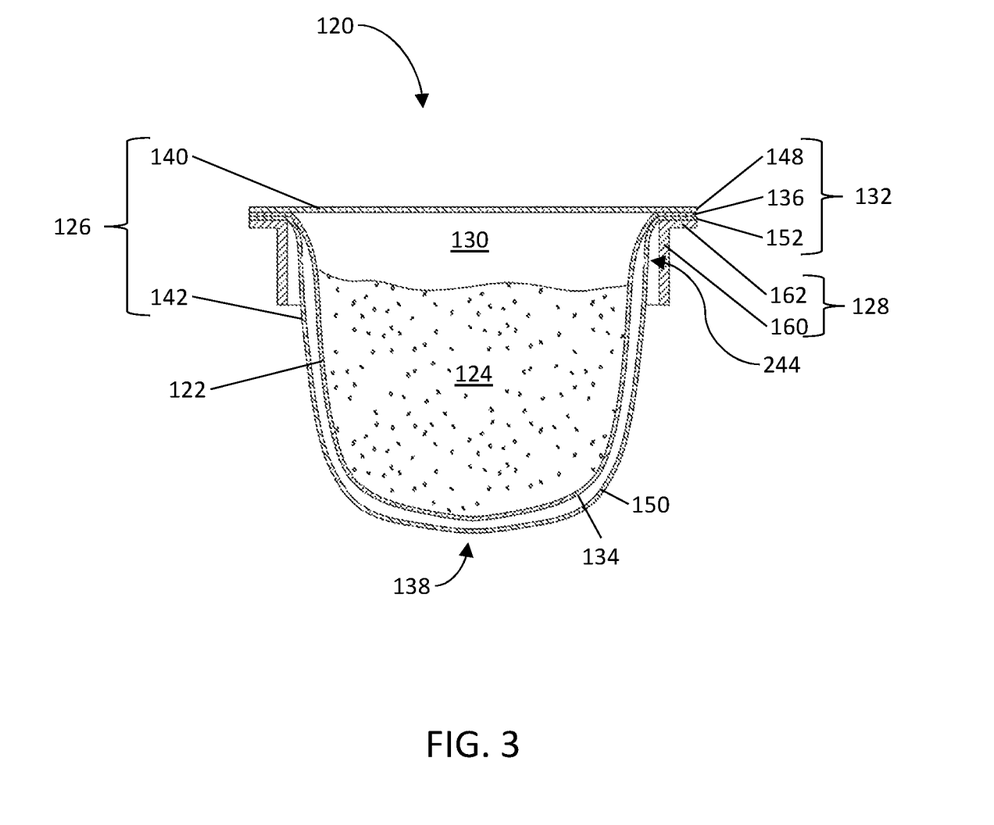
FIG. 3 is a cross-sectional view of the single use beverage pod of FIG. 1, taken along line A-A of FIG. 2.

FIGS. 1 to 3 show a single use beverage pod in accordance with an embodiment of the subject disclosure and generally identified by reference character 120. The beverage pod 120 is used in producing a desired beverage, such as coffee for example. As shown in FIG. 3, the beverage pod 120 comprises a body 122, a beverage medium 124, a protective barrier 126 and a support ring 128. The body 122 defines a cavity 130. The beverage medium 124 is contained within the cavity 130. The protective barrier 126 seals the cavity 130 and substantially surrounds the body 122. The protective barrier 126 is coupled to the body 122 at a seal 132. The support ring 128 is coupled to the protective barrier 126 at the seal 132, and indirectly coupled to the body 122.

The body 122 is configured to hold the beverage medium 124. The body 122 has a cup-like shape 134 that defines the cavity 130 for holding the beverage medium 124. The cup-like shape 134 ends at a peripheral lip 136 of the body 122, which forms part of the seal 132. The body 122 is further configured to provide a filter for separating the beverage medium 124 from the beverage, during production of the beverage. The body 122 is constructed of a filtering material, such as a mesh, which acts as the filter during production of the beverage. The filtering material is permeable to allow the beverage to pass through the body 122. However, the filtering material is fine enough to substantially prevent any particles above a predetermined maximum allowable particle size from passing through the body 122, such as non-soluble ingredients in the beverage medium 124 and soluble ingredients that have not fully dissolved. During construction of the beverage pod 120, the body 122 may be cut from a sheet of nonwoven fabric, such as spunbonded polylactic acid (PLA) or other suitable biopolymer, and may be thermoformed to the desired shape and depth. In the subject embodiment, the body 122 is flexible. In other embodiment, the body 122 may be rigid.

The beverage medium 124 is configured to produce a beverage when exposed to a brewing liquid, such as hot water for example. The beverage medium 124 includes ingredients for forming the beverage, such as ground coffee beans for example. When the brewing liquid passes through the beverage medium 124, the ingredients can flavour the brewing liquid to produce the desired beverage. It will be appreciated that a variety of beverage mediums 124 are suitable for use in the disclosed beverage pod 120, and in some embodiments the beverage medium can include tea leaves, flavoured drink mix, cocoa powder or other suitable ingredients. The specific beverage medium will depend on the desired beverage to be produced. During construction of the beverage pod 120, the cavity 130 in the body 122 is filled at least partially with the beverage medium 124, before the cavity 130 is sealed. The cavity 130 can be filled with the beverage medium 124 to a predetermined fill level for the desired beverage. As will be appreciated, the size and shape of the cavity 130 and the quantity of the beverage medium 124 can each be altered to produce a beverage with the desired flavour and/or to influence the ratio of the beverage medium to the brewing liquid during production of the desired beverage.

The protective barrier 126 is configured to provide at least one of an oxygen barrier and a moisture barrier, and preferably both. As will be appreciated, in the context of the subject disclosure, the term "moisture barrier" means a water vapour barrier and not merely a liquid barrier. The oxygen and/or moisture barrier helps to maintain freshness of the beverage medium 124 and may help to prolong the usable life of the beverage pod 120. The protective barrier 126 is coupled to the body 122 and at least partially seals the beverage medium 124 from a surrounding environment. During construction of the beverage pod 120, the protective barrier 126 may be coupled to the body 122 by thermal fusing and/or ultrasonic welding, without the use of an adhesive. In other embodiments, such as described below, at least part of the protective barrier 126 may be laminated to the body 122 or coated on the body 122 and thermoformed to the desired shape and depth during construction of the beverage pod 120. In the subject embodiment, the protective barrier 126 includes a first membrane 140 and a second membrane 142, which cooperate to substantially seal the beverage medium 124 and provide the oxygen and/or moisture barrier, as described below. The protective barrier 126 comprises a dissolvable region 138.

The dissolvable region 138 is configured to dissolve during production of the beverage to provide a passageway through the protective barrier 126, and out of the beverage pod 120. In the subject embodiment, the dissolvable region 138 is configured to dissolve when exposed to the brewing liquid. In some embodiments, the dissolvable region may be configured to dissolve when exposed for less than a minute to water above 85 degrees Celsius. In other embodiments, the dissolvable region may be configured to dissolve when exposed for less than a minute to water that is in the range of 88 to 97 degrees Celsius. The dissolvable region 138 can be formed from the same material as the rest of the protective barrier 126. Accordingly, the dissolvable region 138 may have the same oxygen and/or moisture barrier properties as the rest of the protective barrier 126. In the subject embodiment, the dissolvable region 138 is formed from the same material as the second membrane 142. In particular, the dissolvable region 138 is formed from polyvinyl alcohol (PVOH) film. Accordingly, the dissolvable region 138 provides an oxygen barrier. Additionally, in the subject embodiment, the dissolvable region 138 is flexible.

The first membrane 140 is configured to partially provide the oxygen and/or moisture barrier and seals an upper end of the beverage medium 124 from the surrounding environment. The first membrane 140 is coupled to a top of the body 122 and covers an opening to the cavity 130. In the subject embodiment, the first membrane 140 has a circular shape and forms a lid for the body 122. In the subject embodiment, the first membrane 140 is directly coupled to the top of the body 122. In particular, a peripheral lip 148 of the first membrane 140 is directly coupled to the peripheral lip 136 of the body 122, at seal 132. During construction of the beverage pod 120, the first membrane 140 may be coupled to the body 122 by thermal fusing, ultrasonic welding, adhesives or other suitable connection type. In the subject embodiment, during production of the beverage pod 120, a lower surface of the peripheral lip 148 of the first membrane 140 is directly coupled to an upper surface of the peripheral lip 136 of the body 122 by thermal fusing and/or ultrasonic welding, without the use of an adhesive. The first membrane 140 is formed of a thin film and/or laminate structure that is substantially impermeable to both oxygen and moisture. In the subject embodiment, the first membrane 140 is formed of a laminate comprising an outer layer of paper and an inner layer of food safe PVOH film. Accordingly, in the subject embodiment, the first membrane 140 provides both an oxygen barrier and a moisture barrier above the beverage medium 124.

The second membrane 142 is configured to partially provide the oxygen and/or moisture barrier and seals a lower end and sides of the beverage medium 124 from the surrounding environment. Accordingly, the first membrane 140 and the second membrane 142 cooperate to substantially seal the beverage medium 124 from the surrounding environment. The second membrane 142 is coupled to a bottom of the body 122 and surrounds the bottom, or underside, of the body 122. The second membrane 142 seals the filter provided by the body 122. The second membrane 142 comprises the dissolvable region 138. In the subject embodiment, the dissolvable region 138 is aligned with the filter provided by the body 122, such that liquid flows directly from the filter to the dissolvable region 138 without redirection during production of the beverage. As shown in FIG. 3, the second membrane 142 has a cup-like shape 150 that ends at a peripheral lip 152. The cup-like shape 150 of the second membrane 142 is complementary to the cup-like 134 of the body 122. In the subject embodiment, the second membrane 142 is directly coupled to the bottom of the body 122. In particular, the peripheral lip 152 of the second membrane 142 is directly coupled to the peripheral lip 136 of the body 122, at seal 132. During construction of the beverage pod 120, the second membrane 142 may be coupled to the body 122 by thermal fusing, ultrasonic welding, adhesives or other suitable connection type. In the subject embodiment, during production of the beverage pod 120, an upper surface of the peripheral lip 152 of the second membrane 142 is directly coupled to a lower surface of the peripheral lip 136 of the body 122 by thermal fusing and/or ultrasonic welding, without the use of an adhesive. In the subject embodiment, the entire second membrane 142 is food safe and formed from the PVOH film. Accordingly, the second membrane 142 is flexible, and provides an oxygen barrier below and to the sides of the beverage medium 124. Additionally, in the subject embodiment, the entire second membrane 142 is dissolvable and defines the dissolvable region 138. In other embodiments, only a portion of the second membrane 142 may be dissolvable. In such embodiments, the dissolvable portion of the second membrane 142 may define the dissolvable region 138.

The support ring 128 is configured to retain the beverage pod 120 in a brewing machine (not shown) during production of the beverage. The support ring 128 is formed from a rigid material, such as rigid biopolymer, plastic or paper, and functions to maintain the shape of the beverage pod 120. The support ring 128 has a circular shape, with a diameter suitable for the brewing machine with which the beverage pod 120 is intended to be used. The support ring 128 includes a vertical wall 160 and a horizontal lip 162. The horizontal lip 162 is coupled to the protective barrier 126 and the body 122, at the seal 132. The vertical wall 160 of the support ring 128 extends downward from an inner circumference of the horizontal lip 162 and surrounds a portion of the protective barrier 126 and the body 122 extending through a center of the support ring 128. In the subject embodiment, the vertical wall 160 has a generally cylindrical shape and encircles the portion of the protective barrier 126 and the body 122. During construction, the support ring 128 may be coupled to the body 122 and the protective barrier 126 by thermal fusing, ultrasonic welding, adhesives or other suitable connection type. In the subject embodiment, during production of the beverage pod 120, an upper surface of the horizontal lip 162 of the support ring 128 is directly coupled to a lower surface of the peripheral lip 152 of the second membrane 142 by thermal fusing and/or ultrasonic welding, without the use of an adhesive.

Once the beverage pod 120 is constructed, the protective barrier 126 substantially seals the beverage medium 124 from the surrounding environment to provide the at least one of the oxygen barrier and the moisture barrier, and preferably both. In this way, the protective barrier 126 functions as an integrated oxygen and/or moisture barrier for the beverage pod 120. Providing the protective barrier 126 as an integrated oxygen and/or moisture barrier for the beverage pod 120 can reduce the need for, and/or complexity of, the packaging for the beverage pod 120. For example, in the subject embodiment, since the first membrane 140 and the second membrane 142 both provide an oxygen barrier, it will be appreciated that the protective barrier 126 provides an integrated oxygen barrier for the beverage pod 120 that substantially seals the beverage medium 124 from the surrounding environment. Accordingly, in the subject embodiment, it may be possible to omit an oxygen barrier from the primary packaging and/or the secondary packaging that would otherwise be included to prolong the usable life of the beverage pod 120. In some embodiments, this may allow for the primary packaging and/or the secondary packaging to be omitted entirely. Reducing the need for, and/or complexity of, the packaging for beverage pods can help to facilitate manufacturing, reduce packaging costs, and reduce the space needed for shipping and/or storage of the beverage pods. Additionally, reducing packaging for beverage pods can help to reduce waste generated when using the pods, and can simplify the process of using the pods by removing the need to unwrap burdensome packaging. Accordingly, it may be possible to reduce waste, facilitate ease of use and/or reduce costs by constructing the beverage pod 120 with the protective barrier 126.

Figure 4:
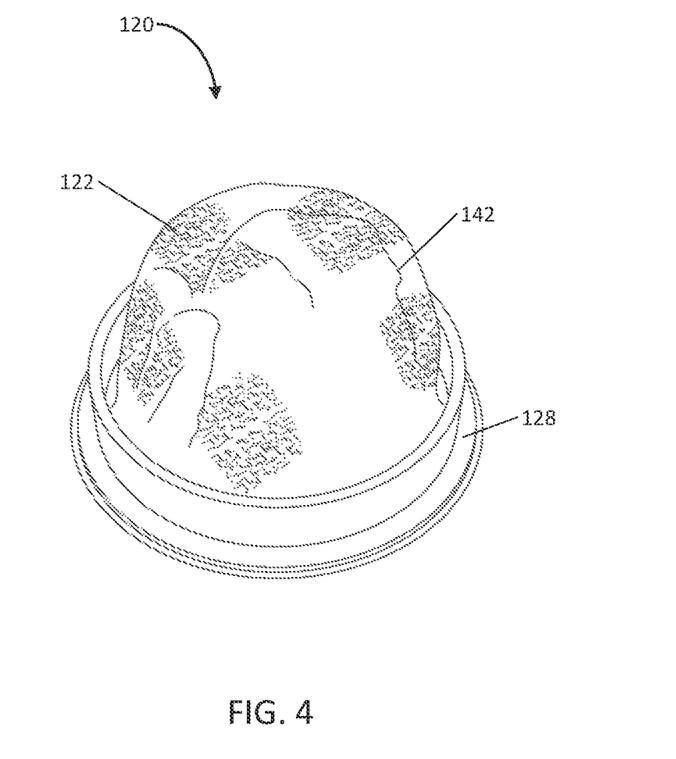
FIG. 4 is an axonometric view of the single use beverage pod of FIG. 1, taken from below and prior to use.
Figure 5:
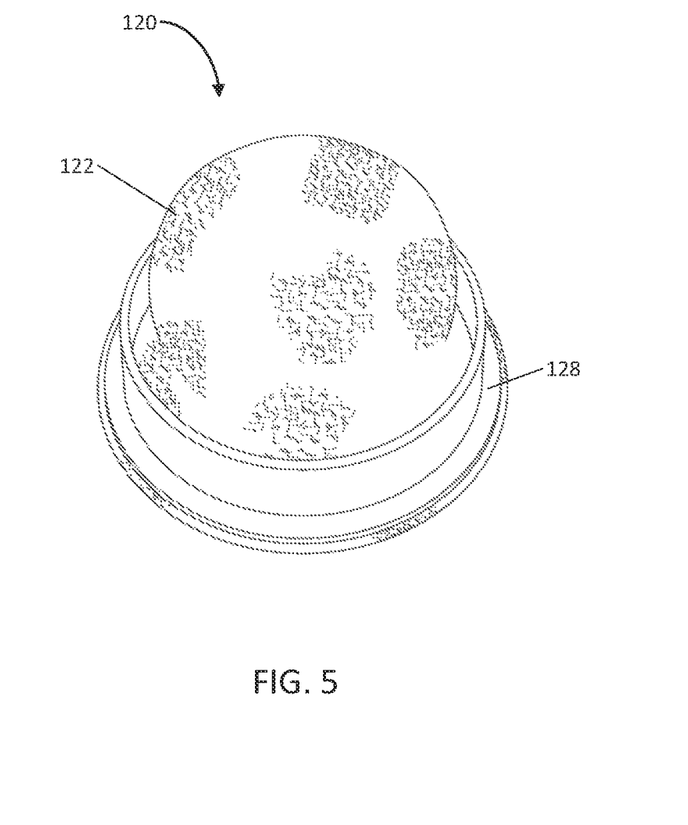
FIG. 5 is an axonometric view of the single use beverage pod of FIG. 1, taken from below and after being used to produce a beverage.

FIGS. 4 and 5 show the beverage pod 120 immediately before and after production of the beverage, respectively. Prior to production of the beverage, the second membrane 142 of the protective barrier 126 covers the underside of the body 122 (as represented by the undulating lines). Additionally, since the protective barrier 126 is formed from PVOH film and is transparent, the body 122 can be seen through the second membrane 142 in FIG. 4 (as represented by the textured patches). In contrast, and as can be seen in FIG. 5, the second membrane 142 is no longer visible after production of the beverage, since the second membrane 142 dissolves during production. As can also be seen in FIG. 5, the body 122 of the beverage pod 120 may swell during production of the beverage, as the beverage medium 124 becomes saturated with the brewing liquid and expands.

When it is desired to produce the beverage, the beverage pod 120 is inserted into a brewing machine. The brewing machine may, for example, be a Keurig™ brewing machine (or a Keurig compatible brewing machine) which is configured to receive a K-Cup™ or a K-Cup compatible pod. In other embodiments, the brewing machine may be a Tassimo™ brewing machine and may be configured to receive a T-Disc™ or T-Disc compatible pod. Other types of brewing machines are also contemplated in further embodiments.

During operation of the brewing machine, the brewing machine introduces a brewing liquid, commonly hot water, into the beverage pod 120 to mix with the beverage medium 124 and produce the desired beverage. In some embodiments, the brewing liquid may be water that is above 85 degrees Celsius. In some embodiments, the brewing liquid may be water that is in the range of 88 to 97 degrees Celsius. As the brewing liquid passes through the beverage pod 120, the brewing liquid percolates through the beverage medium 124 and is filtered by the body 122. The beverage then contacts and dissolves the dissolvable region 138 of the protective barrier 126, to provide a passageway through the protective barrier 126 and out of the beverage pod 120. Thereafter, the beverage exists the brewing machine and may be consumed by a user. As will be appreciated, since the beverage dissolves the dissolvable region 138, the second membrane 142 will be dissolved at least in part and any by-products from dissolving the dissolvable region 138 will end up in the beverage, which may be consumed by the user. Accordingly, the dissolvable region 138 should be formed from a food safe material, which can be consumed safely by the user. In this manner, the beverage pod 120 disclosed herein can be used to produce the desired beverage using a conventional brewing machine without modification thereof.

As will be appreciated, after use, the beverage pod 120 will no longer include any portion of the protective barrier 126 that has been dissolved during production of the desired beverage. Accordingly, the amount of waste produced by the beverage pod 120 is reduced, at least by the weight of the dissolved portion of the protective barrier 126. In embodiments where the entire dissolvable region is dissolved during use of the beverage pod, the materials in the dissolvable region will not be present in the beverage pod after use. Accordingly, in such embodiments, the total variety of materials in the beverage pod after use may be reduced. This can help to facilitate composting and/or recycling of the beverage pods, by reducing the complexity associated with composting and/or recycling multiple materials. In other embodiments, only the part of the protective barrier may dissolve during production of the beverage, such as the bottommost portion of the protective barrier.

Figure 6:
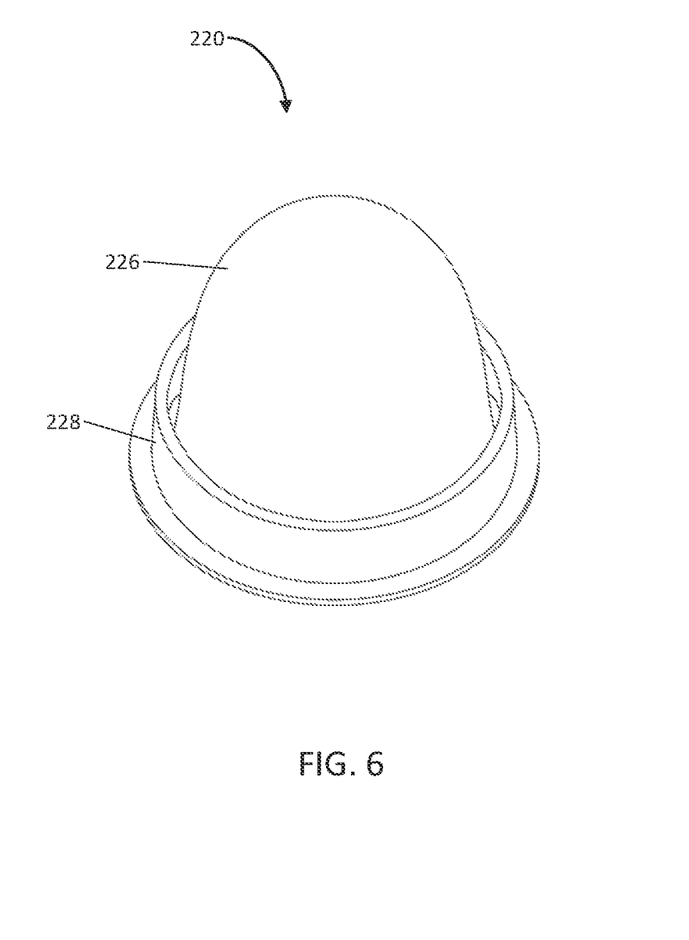
FIG. 6 is an axonometric view of another embodiment of a single use beverage pod, taken from below.
Figure 7:
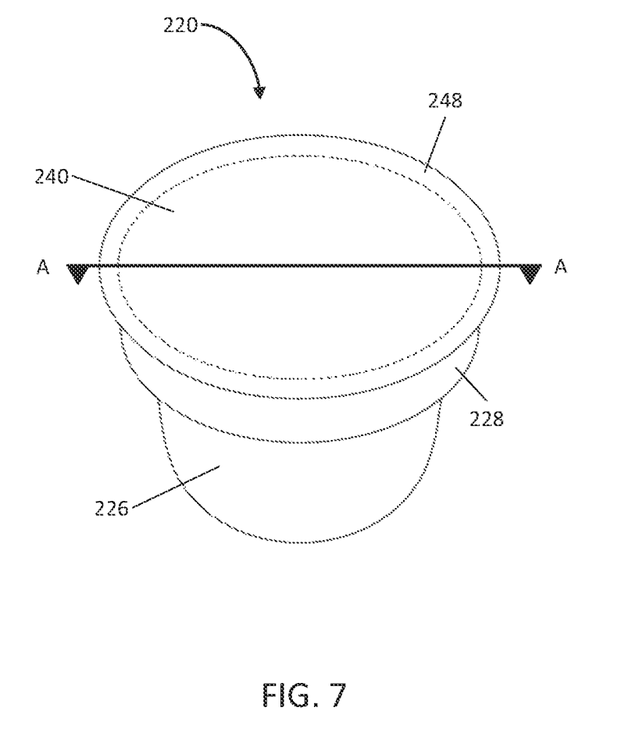
FIG. 7 is an axonometric view of the single use beverage pod of FIG. 6, taken from above.
Figure 8:
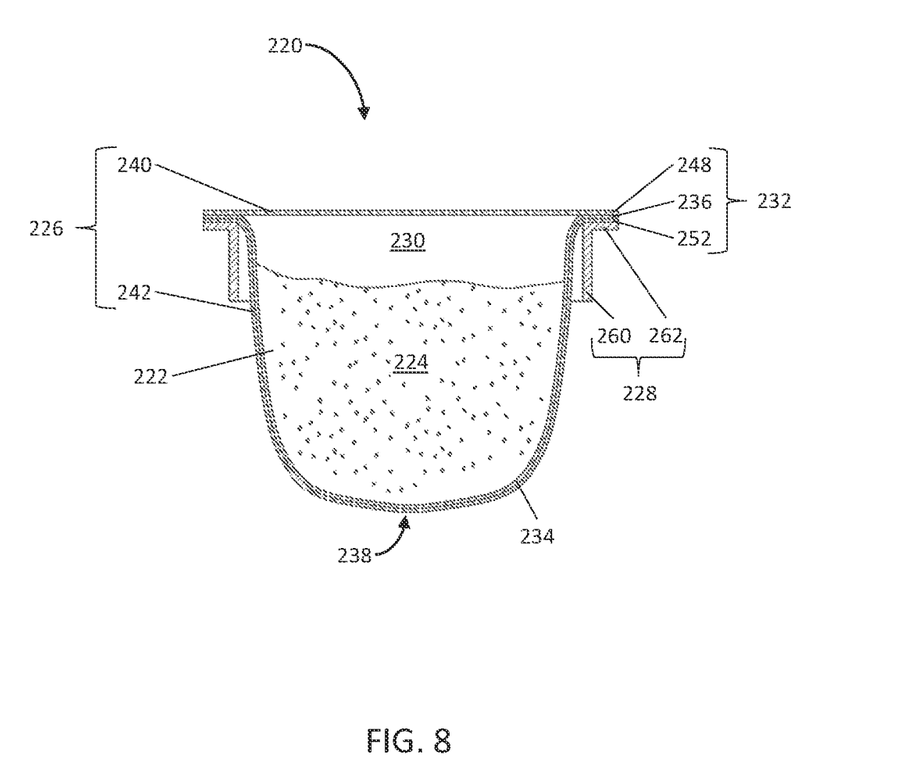
FIG. 8 is a cross-sectional view of the single use beverage pod of FIG. 6, taken along line A-A of FIG. 7.

FIGS. 6 to 8 show a single use beverage pod in accordance with another embodiment of the subject disclosure and generally identified by reference character 220. The beverage pod 220 is similar to the beverage pod 120 and like elements are identified by like reference characters incremented by 100. As shown in FIG. 8, the beverage pod 220 comprises a body 222, a beverage medium 224, a protective barrier 226 and a support ring 228. The body 222, the beverage medium 224 and the support ring 228 are the same as the body 122, the beverage medium 124 and the support ring 128 previously described, respectively. The protective barrier 226 is similar to the protective barrier 126, and serves a similar purpose. However, the construction of the protective barrier 226 differs from that previously described.

As with the previous embodiment, the body 222 defines a cavity 230. The beverage medium 224 is contained within the cavity 230. The protective barrier 226 seals the cavity 230 and substantially surrounds the body 222. The protective barrier 226 is coupled to the body 222 at a seal 232. The support ring 228 is coupled to the protective barrier 226 at the seal 232, and indirectly coupled to the body 222.

The protective barrier 226 is configured to provide at least one of an oxygen barrier and a moisture barrier, and preferably both, similar to the protective barrier 126. Again, in the context of the subject disclosure, the term "moisture barrier" means a water vapour barrier and not merely a liquid barrier. Like in the previous embodiment, the oxygen and/or moisture barrier can help to maintain freshness of the beverage medium 224 and may help to prolong the usable life of the beverage pod 220. The protective barrier 226 is coupled to the body 222 and at least partially seals the beverage medium 224 from a surrounding environment. In the subject embodiment, the protective barrier 226 includes a membrane 240 and a coating 242, which cooperate to substantially seal the beverage medium 224 and provide the oxygen and/or moisture barrier. The membrane 240 is the same as the membrane 140, previously described. The protective barrier 226 comprises a dissolvable region 238.

The dissolvable region 238 is configured to dissolve during production of the beverage to provide a passageway through the protective barrier 226, and out of the beverage pod 220. In the subject embodiment, the dissolvable region 238 is configured to dissolve when exposed to the brewing liquid. In some embodiments, the dissolvable region may be configured to dissolve when exposed for less than a minute to water above 85 degrees Celsius. In other embodiments, the dissolvable region may be configured to dissolve when exposed for less than a minute to water that is in the range of 88 to 97 degrees Celsius. The dissolvable region 238 can be formed from the same material as the rest of the protective barrier 226. Accordingly, the dissolvable region 238 may have the same oxygen and/or moisture barrier properties as the rest of the protective barrier 226. In the subject embodiment, the dissolvable region 238 is formed from the same material as the coating 242. In particular, the dissolvable region 238 is formed from hydroxypropyl cellulose (HPC) and is food safe. Accordingly, the dissolvable region 238 provides an oxygen barrier and a moisture barrier.

The coating 242 serves a similar purpose to the second membrane 142. That is, the coating 242 is configured to partially provide the oxygen and/or moisture barrier and seals a lower end and sides of the beverage medium 224 from the surrounding environment.

Accordingly, the membrane 240 and the coating 242 cooperate to substantially seal the beverage medium 224 from the surrounding environment. The coating 242 is coupled to and provided on a bottom of the body 222 and surrounds the bottom, or underside, of the body 222. As shown in FIG. 8, the coating 242 conforms to the cup-like shape 234 of the body 222. The coating 242 seals the filter provided by the body 222. During construction of the beverage pod 220, the coating 242 can be applied to the body 222 by curtain coating, spraying, printing, lamination or other suitable manufacturing techniques. Subsequently, the support ring 228 can be coupled to the body 222 and coating 242 by thermal fusing and/or ultrasonic welding the support ring 228 to the coating 242 on the body 222, without the use of an adhesive. In the subject embodiment, the entire coating 242 is food safe and formed from HPC. Accordingly, the coating 242 provides an oxygen and a moisture barrier. In particularly, the coating 242 is formed from a solution of 30% HPC. The coating may comprise binders, stabilizers, rheological agents and/or other suitable additives. The coating 242 comprises the dissolvable region 238. In the subject embodiment, the entire coating 242 is dissolvable and defines the dissolvable region 238. In other embodiments, only a portion of the coating 242 may be dissolvable. In such embodiments, the dissolvable portion of the coating 242 may define the dissolvable region 238.

Similar to beverage pod 120, the beverage pod 220 is used in producing a desired beverage, such as coffee for example. As will be appreciated, the process for producing the beverage using beverage pod 220 is the same as that described above with respect to beverage pod 120. Accordingly, as the brewing liquid passes through the beverage pod 220, the brewing liquid percolates through the beverage medium 224 and is filtered by the body 222. The beverage then contacts and dissolves the dissolvable region 238 of the protective barrier 226, to provide a passageway through the protective barrier 226 and out of the beverage pod 220. Thereafter, the beverage exits the brewing machine and may be consumed by a user. As will be appreciated, since the beverage dissolves the dissolvable region 238, the coating 242 will be dissolved at least in part and any by-products from dissolving the dissolvable region 238 will end up in the beverage, which may be consumed by the user. Accordingly, the dissolvable region 238 should be formed from a food safe material, which can be consumed safely by the user. In this manner, the beverage pod 220 disclosed herein can be used to produce the desired beverage using a conventional brewing machine without modification thereof.

Although exemplary embodiments have been described above and are shown in the accompanying drawings, variations and other embodiments will be appreciated by those skilled in the art. A selection of other embodiments is provided below. It will be appreciated that this selection is not exhaustive and further embodiments and variations may be appreciated by those skilled in the art.

Although the body 122, 222 has been shown and described as having a cup-like shape in the above embodiments, it will be appreciated that in other embodiments the body may have other shapes. In some embodiments, the body 122, 222 may have a pail-like shape, a disk shape, a cylindrical shape, a dome-like shape, or other suitable shapes for use with the intended brewing machine.

Although the body 122, 222 has been shown and described as being constructed of a filtering material, it will be appreciated that in other embodiment the body may be formed of other materials, such as rigid plastic. In embodiments where the body is formed from an oxygen and/or moisture impermeable material, such as a rigid plastic, the protective barrier and the body may cooperate to seal the beverage medium from the surrounding environment. In such embodiments, the body may have a cylinder-like shape that seals the sides of the beverage medium, and the protective barrier may seal the top and bottom ends of the beverage medium from the surrounding environment. Alternatively, the body may have a dome-like shape that seals the sides and one of the top and bottom ends of the beverage medium, and the protective barrier may seal the other of the top and bottom ends of the beverage medium from the surrounding environment. Various shapes and arrangements wherein the body and the protective barrier cooperate to provide at least one of the oxygen and moisture barrier will be apparent to those skilled in the art.

Although the body 122, 222 has been shown and described as providing the filter by being constructed of a filtering material, it will be appreciated that in other embodiments the body may provide the filter by including a separate filter that is retained in the body, or by including a portion of the body with perforations to act as the filter. In some embodiments, the filter may be formed from natural fiber-based material or from a polymer-based material, for example. In some embodiments, the filter may comprise a screen that is retained by the body. In other embodiments, the filter may comprise a porous permeable material.

Although the body 122, 222 has been described as being thermoformed during construction of the beverage pod 120, 220, it will be appreciated that in other embodiments the body may be formed by other suitable methods, such as by injection moulding, vacuum molding, compression molding or co-injection, for example.

Although the body 122, 222 has been shown and described as being cut from a sheet of nonwoven fabric and thermoformed to the desired shape and depth, it will be appreciated that in other embodiments the body may be cut from a sheet of filter paper and folded or otherwise formed to the desired shape and depth. In some embodiments, the filter paper may be cut, folded and/or shaped into a cup-like shape. The filter paper can be formed into the desired shape before or during production of the beverage pod. For example, in some embodiments, the body may be cut from a sheet of filter paper and formed into the desired shape before production of the beverage pod. Thereafter, during production of the beverage pod, the pre-formed body may be fed into the production line for the beverage pod.

Although the body 122, 222 has been shown and described as providing a filter for separating the beverage from the beverage medium during production of the beverage, it will be appreciated that in other embodiments the filter may be omitted. For example, in embodiments where the beverage medium is configured to fully dissolve during production of the beverage, the filter may be unnecessary and may be omitted.

Although the beverage pod 120, 220 has been shown and described as including the support ring 128, it will be appreciated that in other embodiments the support ring may be omitted. For example, in some conventional brewing machines a support ring is not required to secure the beverage pod within the machine during production of beverage and, accordingly, the support ring 128 may be omitted. For example, in some embodiments the brewing machine may clamp the seam 132 to secure the beverage pod within the brewing machine.

Although the support ring 128 has been shown and described as having a vertical wall 160 with a generally cylindrical shape, it will be appreciated that in other embodiments the support ring 128 may not be cylindrical and may have other suitable shapes. For example, in some embodiments the support ring may have a wall with a sloped surface which forms an angle with an axis extending along the center of the support ring. For example, the support ring may have a vertical wall portion that forms the shape of a truncated cone having two open ends. The support ring can take on many different shapes and configurations without significantly affecting the functionality of the pod, and depending on the brewing machine with which the beverage pod is intended to be used.

Although the protective barrier 126 has been shown and described as having a first membrane 140, a second membrane 142 and a dissolvable region 138 all comprising or formed from PVOH film, it will be appreciated that in other embodiments the protective barrier may have other suitable configurations and the dissolvable region may be formed of other suitable materials. For example, in some embodiments, the protective barrier may be formed from dissolvable plant derived polymers with suitable characteristics that are similar to that of PVOH, such as similar barrier and dissolvability characteristics. In some embodiments, one or more of the first membrane, the second membrane and the dissolvable region may be formed of the dissolvable plant derived polymer. In yet other embodiments, only the dissolvable region may be formed of the dissolvable plant derived polymer. In some embodiments, at least one of the first membrane 140, the second membrane 142 and the dissolvable region 138 may be formed of Vivos® PXP9643 film, which is a PVOH film produced by MonoSol™, a Kuraray™ company of Merrillville, Indianapolis, USA. In some embodiments, at least one of the first membrane 140, the second membrane 142 and the dissolvable region 138 can be formed of Vivos LXP/PXP11146 film, which is also a PVOH film produced by MonoSol. In some embodiments, a thickness of at least one of the first membrane 140, the second membrane 142 and the dissolvable region 138 can be in a range from 38 to 76 microns (1.5 to 3 mils). In some embodiments, the thickness of at least one of the first membrane 140, the second membrane 142 and the dissolvable region 138 can be 51 microns (2 mil) when formed of Vivos PXP9643 film. In yet other embodiments, the thickness of at least one of the first membrane 140, the second membrane 142 and the dissolvable region 138 can be 76 microns (3 mil) when formed of Vivos LXP/PXP11146 film.

Although the coating 242 and the dissolvable region 238 have been shown and described as being formed from HPC, it will be appreciated that in other embodiments the coating and/or the dissolvable region may be formed from other suitable materials. In some embodiments, the dissolvable region and/or the coating may be formed from at least one of polyvinyl alcohol (PVOH), hydroxypropyl cellulose (HPC), a polysaccharide (such as Pullulan™), modified food starch and a dissolvable plant derived polymer, including solutions thereof. In some embodiments, the HPC may be Nisso™ HPC, grade SSL, from Nippon Soda Co. Ltd. In further embodiments, the modified food starch may be Instant Pure-Cote™ B792, from the Grain Processing Corporation of Muscatine, Iowa, USA.

Although the dissolvable region 138, 238 has been described as being formed from the same material as the second membrane 142 or the coating 242, respectively, it will be appreciated that in other embodiments the dissolvable region may be formed from a different material than the rest of the protective barrier 126, 226. In such embodiments, the dissolvable region may have different oxygen and/or moisture barrier properties from the rest of the protective barrier. For example, the dissolvable region may be formed from a material that dissolves more easily than that of the rest of the protective barrier. In such embodiments, the dissolvable region may provide less of an oxygen and/or a moisture barrier than the rest of the protective barrier, but may quickly dissolve to facilitate egress of the beverage from the beverage pod. In other embodiments, the dissolvable region may be formed from a slow dissolving material, to achieve greater contact time between the brewing liquid and the beverage medium and/or to increase pressure in the beverage pod during production of the beverage. Increasing contact time and/or increasing internal pressure may help to improve the quality of the beverage produced using the beverage pod. As will be appreciated, it may be preferable to form the dissolvable region from a food safe material that generally does not impart sensory attributes to the beverage, which may reduce the quality of the beverage.

Although the protective barrier 126, 226 has been shown and described as surrounding the body 122, 222, it will be appreciated that in other embodiments the body may surround at least a portion of the protective barrier. For example, in some embodiments, the position of the body 122 and the second membrane 142, or the position of the body 222 and the coating 242, may be reversed from that shown in FIGS. 3 and 8. In such embodiments, the body 122 or the body 222 may surround a bottom (or an underside) of the second membrane 142 or the coating 242, respectively. Accordingly, the second membrane 142 or the coating 242 may be at least partially inside the body 122 or the body 222, respectively. In some embodiments, the first membrane 140 and the second membrane 142 can directly surround the beverage medium 124, or the membrane 240 and the coating 252 can directly surround the beverage medium 224. Additionally, in such embodiments, the second membrane 142 can be directly coupled to the first membrane 140. Directly coupling the first and second membranes 140, 142 may improve bonding during construction of the beverage pod 120, particularly if the inner layer of the first membrane 140 and the second membrane 142 are both formed of the same material, such as PVOH, since bonding like materials is generally stronger than bonding disparate materials. Alternatively, if the second membrane 142 is positioned outside of the body 122, as shown in FIG. 3, a user may be provided with the option of removing at least portion of the second membrane 142 prior to use of the beverage pod 120, which may be seen as advantageous to users who are concerned about by-products in their beverages. In some embodiments, the second membrane may include a weakened region 244, such as a thinned region as shown in FIG. 3, to facilitate removal of at least a portion of the second membrane.

Although the membrane 140, 240 has been described as being formed of a laminate comprising an outer layer of paper and an inner layer of food safe PVOH film, it will be appreciated that in other embodiments the membrane 140, 240 may be formed of other suitable materials. For example, in some embodiments, the membrane 140, 240 may be formed of a laminate comprising an outer layer of paper and an inner layer formed of dissolvable plant derived polymers with suitable characteristics that are similar to that of PVOH, such as similar barrier and dissolvability characteristics. In yet other embodiments, the membrane 140, 240 may be formed of a laminate comprising a layer of paper, a layer of ridged biopolymer and a layer of polylactic acid (PLA). In yet other embodiments, the membrane 140, 240 may be formed of a laminate comprising an outer layer of nonwoven fabric and an inner layer of a food safe material, such as at least one of PVOH, HPC, a polysaccharide (such as Pullulan™), modified food starch and a dissolvable plant derived polymer, or other suitable materials.

Although the first membrane 140 and the second membrane 142 have both been described as providing an oxygen barrier and, accordingly, the protective barrier 126 provides an oxygen barrier, it will be appreciated that in other embodiments the protective barrier may provide only a moisture barrier, or may provide both a moisture and an oxygen barrier. For example, in some embodiments, both the first membrane and the second membrane may provide an oxygen barrier and a moisture barrier, such that the protective barrier provides both an oxygen barrier and a moisture barrier. Similarly, although the membrane 240 and the coating 242 have both been described as providing an oxygen and a moisture barrier and, accordingly, the protective barrier 226 provides both an oxygen barrier and a moisture barrier, it will be appreciated that in other embodiments the membrane and the coating may only provide one of an oxygen barrier and a moisture barrier, such that the protective barrier only provides a moisture barrier or an oxygen barrier. As will be appreciated, since the protective barriers disclosed herein provide a moisture barrier and/or an oxygen barrier, equivalent barriers may be omitted from the primary packaging and/or the secondary packaging.

Although embodiments have been described above and are shown in the accompanying drawings, it will be appreciated by those skilled in the art that variations and modifications may be made without departing from the scope as defined by the appended claims, and the scope of the claims should be given the broadest interpretation consistent with the specification as a whole.

What is claimed is:

1. A single use beverage pod for use in producing a beverage, the beverage pod comprising:
    a body defining a cavity;
    a beverage medium contained within the cavity; and
    a protective barrier coupled to the body and at least partially sealing the beverage medium from a surrounding environment to provide at least one of an oxygen barrier and a moisture barrier, the protective barrier having a membrane that includes a dissolvable region that is configured to dissolve during production of the beverage to provide a passageway through the protective barrier,
    wherein the dissolvable region defines at least part of an exterior surface of the beverage pod and is positioned outside of the body, such that at least a portion of the dissolvable region is removable by a user prior to producing the beverage; and
    wherein the membrane includes a weakened region to facilitate removal of at least the portion of the dissolvable region of the membrane.

2. The beverage pod of claim 1, wherein the body comprises a filter for separating the beverage from the beverage medium during production of the beverage.

3. The beverage pod of claim 2, wherein the dissolvable region is aligned with the filter.

4. The beverage pod of claim 2, wherein the body is formed from one of a shaped filter paper and a molded nonwoven fabric, and wherein the one of the shaped filter paper and the molded nonwoven fabric provides the filter.

5. The beverage pod of claim 1, wherein the dissolvable region of the membrane substantially surrounds a bottom of the body, and wherein the protective barrier further comprises a lid that covers a top of the body and cooperates with the membrane to substantially seal the beverage medium and provide the at least one of the oxygen barrier and the moisture barrier.

6. The beverage pod of claim 1, wherein the entire membrane is dissolvable in water and defines the dissolvable region.

7. The beverage pod of claim 1, further comprising a support ring coupled to the body and the protective barrier, the support ring being configured to secure the beverage pod within a brewing machine during production of the beverage.

8. The beverage pod of claim 7, wherein the support ring, the membrane of the protective barrier and the body are directly coupled together without an adhesive, with the membrane located between the support ring and the body.

9. The beverage pod of claim 1, wherein the dissolvable region is food safe and is formed from at least one of polyvinyl alcohol (PVOH), hydroxypropyl cellulose (HPC), polysaccharide, Pullulan, modified food starch and a dissolvable plant derived polymer.

10. The beverage pod of claim 9, wherein the dissolvable region is formed from HPC.

11. The beverage pod of claim 1, wherein the dissolvable region substantially surrounds an underside of the body of the beverage pod.

12. The beverage pod of claim 1, wherein the body of the beverage pod includes a top side and a bottom side that meet at a peripheral lip of the body, and wherein the dissolvable region of the membrane extends from the peripheral lip of the body and substantially surrounds the bottom side of the body.

13. The beverage pod of claim 1 wherein the dissolvable region defines the bottommost part of the exterior surface of the beverage pod.

14. The beverage pod of claim 1, wherein the portion of the dissolvable region is manually removable by a user without tools.

15. A method for producing a beverage using the single use beverage pod, of claim 1 the method comprising:
    removing at least a portion of the membrane of the protective barrier prior to inserting the beverage pod into a brewing machine;
    inserting the beverage pod into the brewing machine; and
    introducing a brewing liquid into the beverage pod to mix with the beverage medium and produce the beverage.

16. The method of claim 15, wherein the dissolvable region of the membrane defines at least part of an exterior surface of the beverage pod and is positioned outside of a body of the beverage pod, and wherein the removing of at least the portion of the dissolvable region comprises manually removing at least the portion of the dissolvable region without tools.

* * * * *